(12) United States Patent
Hosier

(10) Patent No.: US 8,810,616 B2
(45) Date of Patent: Aug. 19, 2014

(54) DEVICE AND METHOD FOR EXTENDING LIGHT EMITTING DIODE PRINTBAR LIFE OR IMPROVING IMAGE QUALITY

(75) Inventor: Paul A. Hosier, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 224 days.

(21) Appl. No.: 12/957,896

(22) Filed: Dec. 1, 2010

(65) Prior Publication Data

US 2012/0140014 A1 Jun. 7, 2012

(51) Int. Cl.
| | |
|---|---|
| *B41J 2/385* | (2006.01) |
| *B41J 2/40* | (2006.01) |
| *B41J 2/405* | (2006.01) |
| *B41J 2/435* | (2006.01) |
| *B41J 2/45* | (2006.01) |
| *G06K 15/12* | (2006.01) |

(52) U.S. Cl.
CPC .... *B41J 2/45* (2013.01); *B41J 2/40* (2013.01); *B41J 2/405* (2013.01); *B41J 2/385* (2013.01); *B41J 2/435* (2013.01); *G06K 15/1247* (2013.01)
USPC ............ 347/145; 347/130; 347/236; 347/238

(58) Field of Classification Search
CPC .............. B41J 2/385; B41J 2/40; B41J 2/405; B41J 2/435; B41J 2/45
USPC .................................. 347/130, 145, 236, 238
See application file for complete search history.

(56) References Cited

U.S. PATENT DOCUMENTS

| | | | | |
|---|---|---|---|---|
| 4,799,071 | A | * | 1/1989 | Zeise et al. ..................... 347/233 |
| 4,839,672 | A | * | 6/1989 | Reinten ......................... 347/238 |
| 4,941,004 | A | * | 7/1990 | Pham et al. .................... 347/132 |
| 4,982,203 | A | | 1/1991 | Uebbing |
| 5,016,027 | A | | 5/1991 | Uebbing |
| 5,668,587 | A | * | 9/1997 | Hammond et al. ............ 347/237 |
| 2006/0115912 | A1 | * | 6/2006 | Masumoto ....................... 438/22 |
| 2007/0019065 | A1 | * | 1/2007 | Mizes ............................ 347/238 |

* cited by examiner

*Primary Examiner* — Justin Seo
*Assistant Examiner* — Kendrick Liu
(74) *Attorney, Agent, or Firm* — Simpson & Simpson, PLLC

(57) ABSTRACT

A device including: a photoreceptor; an LED printbar; and a computer processor for: determining how long LEDs on the printbar are energized while the device is operated to generate an image output; determining that a first plurality of LEDs has been energized less than a second plurality of LEDs; energizing the first plurality of LEDs for a correction time period as the LEDs are aligned with an inter-document zone (IDZ); and de-energizing the second plurality of LEDs during the time period. Energizing the second plurality of LEDs is unrelated to energizing the LEDs for purposes of evaluating an image. The time period is concurrent with operation of the device to generate an image output.

19 Claims, 6 Drawing Sheets

DEVICE AND METHOD FOR EXTENDING LIGHT EMITTING DIODE PRINTBAR LIFE OR IMPROVING IMAGE QUALITY

TECHNICAL FIELD

The present disclosure relates to a light-emitting diode (LED) print-head with controlled aging of low usage LEDs and a method of controllably aging low usage LEDs in a LED print-head.

BACKGROUND

FIG. 1 schematically shows prior art image recording apparatus 100 with light-emitting diode (LED) printbar 101. Printbar 101 is an example of an LED full width array imager. An LED full width array imager consists of an arrangement of a large number of closely spaced LEDs in a linear array. By providing relative motion between the LED printbar and a photoreceptor in a process direction, and by selectively energizing the LEDs at the proper times in a scan direction, a desired latent electrostatic image can be produced on the recording member. The production of a desired latent image is usually performed by having each LED expose a corresponding pixel on the recording member in accordance with image-defining video data information applied to the printbar through driver circuitry. Conventionally, digital data signals from a data source, which may be a Raster Input Scanner (RIS), a computer, a word processor or some other source of digitized image data is clocked into a shift register. Some time after the start of a line signal, individual LED drive circuits are then selectively energized to control the on/off timing of currents flowing through the LEDs. The LEDs selectively turn on and off at fixed intervals to form a line exposure pattern on the surface of the photoreceptor. A complete image is formed by successive line exposures.

The following provides further detail regarding prior art apparatus 100. Printbar 101 includes: LED's controlled according to recording signals supplied from an unrepresented external device; a rotary drum 102 provided with a photoreceptor along the periphery thereof; a rod lens array 103 for focusing the light beams of the LED's in the printing head 101 onto the photoreceptor surface of the drum 102; a corona charger 104 for charging the photoreceptor in advance; a developing station 105 for developing an electrostatic latent image with toner; a recording sheet 106; a cassette 107 housing a plurality of recording sheets 106; a feed roller 108 for feeding the recording sheet 106 from the cassette 107; registration rollers 109 for matching the front end of the recording sheet with the leading end of the image formed on the drum 102; a transfer charger 110 for transferring the developed image from the drum 102 onto the recording sheet 106; a separating roller 111 for separating the recording sheet from the drum 102; a belt 112 for transporting the recording sheet; fixing rollers 113; discharge rollers 114 for discharging the recording sheet onto a tray 115; a blade cleaner 116 for removing the toner remaining on the drum 102; a container 117 for the recovered toner; and a lamp 118 for eliminating charge remaining on the drum 102.

FIG. 2 shows typical curves for LED degradation with time. Curves 150 show performance at rated current. Curves 152, at 2.5 times rated current, show accelerated life tests. It should be noted that during early life most LEDs increase in power as they "anneal" and then exponentially drop in time. Thus, for individual LED emitters, for example, spaced at 600 dots per inch (dpi) or 1200 dpi spacing in a full process width printbar, such as printbar 101, power will vary with time with an increase initially followed by a long slow degradation. It is commonly understood that the degradation is mainly dependent on the total usage (time×duty cycle) of the emitters and current level, with some variation from batch to batch due to semiconductor processing.

FIG. 3 shows typical LED usage for LED printbar 101 with respect to portions of the photoreceptor for drum 102. The total usage time for LEDs in a printbar can vary substantially, for example, depending on the portion of the photoreceptor with which an LED is aligned in a process direction. For example, LEDs aligned with portion 154 of the photoreceptor outside the paper margin with may only have a 0-1% duty cycle, and LEDs aligned with portion 156 of the photoreceptor inside the paper margin may have a 5-20% duty cycle. Thus, after the equivalent of 500 hrs 100% duty cycle for LEDs aligned with portion 156, LEDs aligned with portion 154 may have only 50 hrs or less of 100% duty cycle. As a result, LEDs aligned with portion 154 may be 5-10% brighter, as seen in FIG. 2, than at time 0 and the rest of the LEDs may have degraded 10%. As an example, if a full page width half-tone image is printed without any margins, thus using LEDs aligned with portions 154 and 156, there may be a noticeable band at the location of the border between portions 154 and 156 due to the 15-20% difference in power level noted above between LEDs associated with portions 154 and 156.

U.S. Pat. No. 4,982,203 discloses correcting light output for LEDs in an LED printbar by predicting and measuring light degradation and then modifying current to the LEDs accordingly. U.S. Pat. No. 5,016,027 teaches periodic calibration and adjustment of on-time for LEDs in an LED printbar using manual scanner calibrations or with optical sensor feedback. U.S. Pat. No. 5,668,587 discloses determining on-time differences among LEDs in an LED printbar and uses an average aging curve to determine adjustments to a drive circuit.

SUMMARY

According to aspects illustrated herein, there is provided a method for extending light emitting diode (LED) printbar life or improving image quality for a image recording device including a photoreceptor and an LED printbar with a first plurality of LEDs, including: determining, using a processor for at least one specially programmed computer, how often LEDs in the first plurality of LEDs are energized during a first operational time period in which the image recording device is operated to generate an image output; determining, using the processor, that a second plurality of LEDs in the first plurality of LEDs has been energized less than a third plurality of LEDs in the first plurality of LEDs; energizing, using the processor, the second plurality of LEDs for a correction time period; and de-energizing, using the processor, the third plurality of LEDs during the correction time period, wherein the energizing of the second plurality of LEDs during the correction time period is unrelated to energizing the second plurality of LEDs for purposes of evaluating an image produced by the energizing of the second plurality of LEDs. The correction time period is non-concurrent with a second operational time period in which the image recording device is operated to generate an image output, and the photoreceptor remains in a first fixed position during the correction time period; or the correction time period is non-concurrent with a second operational time period in which the image recording device is operated to generate an image output, and the toner supply to the photoreceptor is restricted or eliminated during the correction time period.

According to aspects illustrated herein, there is provided a method for extending light emitting diode (LED) printbar life or improving image quality for a image recording device including a photoreceptor and an LED printbar with a first plurality of LEDs, including: determining, using a processor for at least one specially programmed computer, how often LEDs in the first plurality of LEDs are energized during a first operational time period in which the image recording device is operated to generate an image output; determining, using the processor, that a second plurality of LEDs in the first plurality of LEDs has been energized less than a third plurality of LEDs in the first plurality of LEDs; energizing, using the processor, the second plurality of LEDs for a correction time period as the second plurality of LEDs is aligned with an inter-document zone (IDZ) on the photoreceptor; and de-energizing, using the processor, the third plurality of LEDs during the correction time period. The correction time period is concurrent with a second operational time period in which the image recording device is operated to generate an image output, and the energizing of the second plurality of LEDs during the correction time period is unrelated to energizing the second plurality of LEDs for purposes of evaluating an image produced by the energizing of the second plurality of LEDs.

According to aspects illustrated herein, there is provided a method for extending light emitting diode (LED) printbar life or improving image quality for a image recording device including a photoreceptor and an LED printbar with a first plurality of LEDs, including: determining, using a processor for at least one specially programmed computer, how often LEDs in the first plurality of LEDs are energized during a first operational time period in which the image recording device is operated to generate an image output; determining, using the processor, that a second plurality of LEDs in the first plurality of LEDs has been energized less than a third plurality of LEDs in the first plurality of LEDs; and using the processor, during a correction time period, to energize the second plurality of LEDs and de-energize the third plurality of LEDs. The energizing of the second plurality of LEDs during the correction time period is unrelated to energizing the second plurality of LEDs for purposes of evaluating an image produced by the energizing of the second plurality of LEDs. The correction time period is concurrent with the operational time period, and the second plurality of LEDs is aligned with an inter-document zone (IDZ) on the photoreceptor; or, the correction time period is non-concurrent with the operational time period, and the photoreceptor remains in a fixed position during the correction time period; or, the correction time period is non-concurrent with the operational time period, and the toner supply to the photoreceptor is restricted or eliminated during the correction time period.

According to aspects illustrated herein, there is provided an image recording device with extended light emitting diode (LED) printbar life or improving image quality, including: a photoreceptor; an LED printbar with a first plurality of LEDs; and a processor for at least one specially programmed computer. The processor is for: determining how often LEDs in the first plurality of LEDs are energized during a first operational time period in which the image recording device is operated to generate an image output; determining that a second plurality of LEDs in the first plurality of LEDs has been energized less than a third plurality of LEDs in the first plurality of LEDs; energizing the second plurality of LEDs for a correction time period as the second plurality of LEDs is aligned with an inter-document zone (IDZ) on the photoreceptor; and de-energizing the third plurality of LEDs during the correction time period. The energizing of the second plurality of LEDs during the correction time period is unrelated to energizing the second plurality of LEDs for purposes of evaluating an image produced by the energizing of the second plurality of LEDs. The correction time period is concurrent with a second operational time period in which the image recording device is operated to generate an image output.

According to aspects illustrated herein, there is provided an image recording device with extended light emitting diode (LED) printbar life or improving image quality, including: a photoreceptor; an LED printbar with a first plurality of LEDs; and a processor for at least one specially programmed computer. The processor is for: determining how often LEDs in the first plurality of LEDs are energized during a first operational time period in which the image recording device is operated to generate an image output; determining that a second plurality of LEDs in the first plurality of LEDs has been energized less than a third plurality of LEDs in the first plurality of LEDs; energizing the second plurality of LEDs for a correction time period; and de-energizing the third plurality of LEDs during the correction time period. The energizing of the second plurality of LEDs during the correction time period is unrelated to energizing the second plurality of LEDs for purposes of evaluating an image produced by the energization of the second plurality of LEDs. The correction time period is non-concurrent with a second operational time period in which the image recording device is operated to generate an image output, and the photoreceptor remains in a first fixed position during the correction time period; or, the correction time period is non-concurrent with a second operational time period in which the image recording device is operated to generate an image output, and toner supply to the photoreceptor is restricted or eliminated during the correction time period.

According to aspects illustrated herein, there is provided an image recording device with extended light emitting diode (LED) printbar life or improving image quality, including: a photoreceptor; an LED printbar with a first plurality of LEDs; and a processor for at least one specially programmed computer. The processor is for: determining how often LEDs in the first plurality of LEDs are energized during a first operational time period in which the image recording device is operated to generate an image output; determining that a second plurality of LEDs in the first plurality of LEDs has been energized less than a third plurality of LEDs in the first plurality of LEDs; and during a correction time period, energizing the second plurality of LEDs and de-energize the third plurality of LEDs. The correction time period is concurrent with the operational time period, and the second plurality of LEDs is aligned with an inter-document zone (IDZ) on the photoreceptor; or the correction time period is non-concurrent with the operational time period, and the photoreceptor remains in a fixed position during the correction time period; or the correction time period is non-concurrent with the operational time period, and the toner supply to the photoreceptor is restricted or eliminated during the correction time period.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

Furthermore, as used herein, the words "printer," "printer system", "printing system", "printer device" and "printing device" as used herein encompasses any apparatus, such as a digital copier, bookmaking machine, facsimile machine, multi-function machine, etc. which performs a print outputting function for any purpose.

Moreover, although any methods, devices or materials similar or equivalent to those described herein can be used in the practice or testing of these embodiments, some embodiments of methods, devices, and materials are now described.

Figure 4:
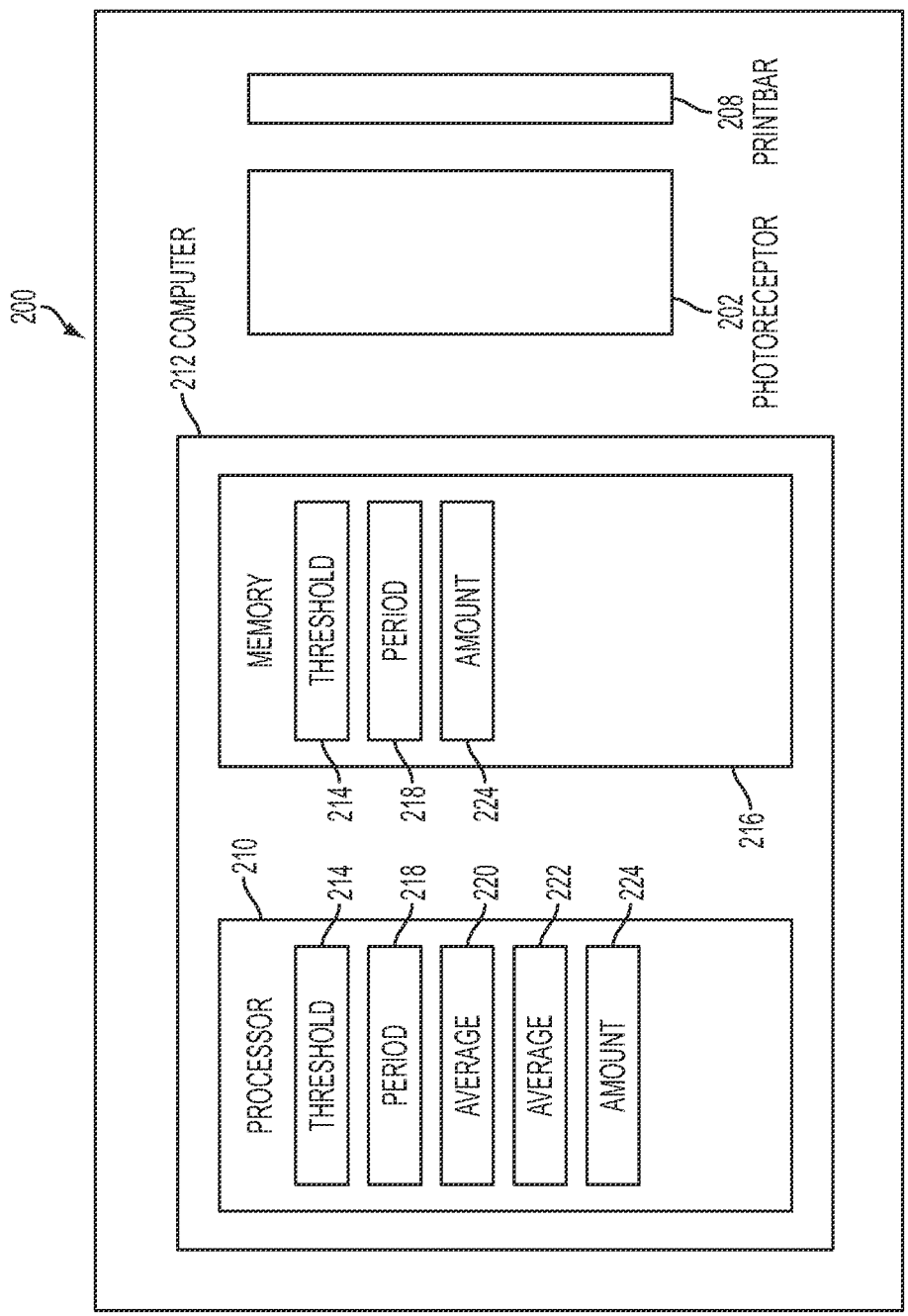
FIG. 4 is a schematic block diagram of an image recording device with extended LED printbar life or improving image quality.

FIG. 4 is a schematic block diagram of image recording device 200 with extended light emitting diode (LED) printbar life or improving image quality.

Figure 5:
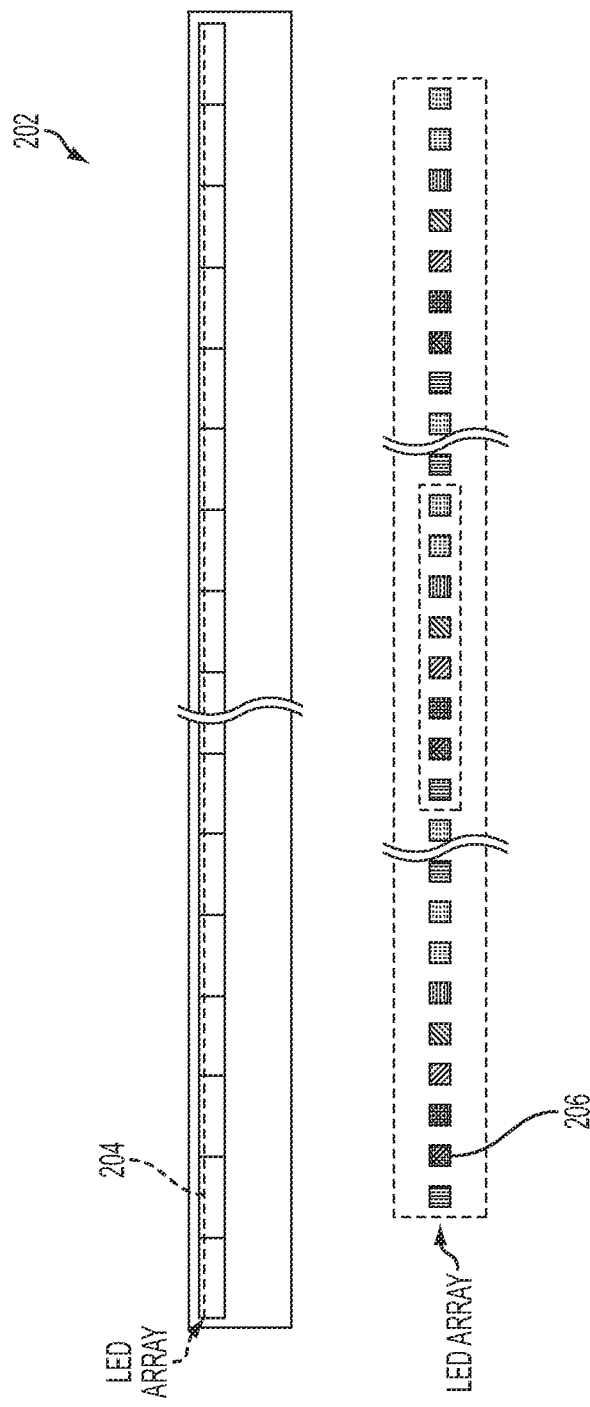
FIG. 5 illustrates the printbar shown in FIG. 4 with a plurality of LED chips; and, FIG. 6 illustrates the printbar and portions of the photoreceptor shown in FIG. 4.

FIG. 5 illustrates printbar 202 shown in FIG. 4 with plurality of LED chips 204. The following should be viewed in light of FIGS. 4 and 5. Device 200 includes LED printbar 202 with a plurality of LEDs 206; photoreceptor 208; and processor 210 for at least one specially programmed computer 212. In one embodiment (not shown), computer 212 is remotely located from device 200. Plurality of chips 204 is disposed in a linear array. Although a specific number of chips and total LEDs is shown in FIG. 4, it should be understood that printbar 202 is not limited to the number of chips and total LEDs shown and that other number of chips and total LEDs are possible.

In general, variations between wafers from which chips are formed may result in appreciable differences among LEDs formed from different wafers. In general, LED chips for a particular LED printbar can be assumed to be from a same wafer. Variations within a wafer, particularly for an area from which a group of LED chips for an LED printbar are formed, are small enough to support the assumption that the characteristics and performance of the LEDs on the chips will be substantially similar. Thus, it can be assumed that LEDs 206 age and degrade at similar respective rates.

As noted above, unequal usage and aging of LEDs in an LED printbar can lead to undesirable results. Device 200 operates to equalize aging of LEDs 206 thereby mitigating these undesirable results. In one embodiment, the device determines the status of LEDs 206 with respect to usage and aging, for example, the processor is for determining how often LEDs in plurality of LEDs 206 are energized during a first operational time period. By operational time period, we mean a time period during which the device is operated to generate an image output, for example, the device is operated to print a document. In one embodiment, the determination is made by counting image pixels.

The processor determines whether a first plurality, or first sub-set, of LEDs 206 has been energized less than a second plurality, or second sub-set, of LEDs 206. Determining how often LEDs in plurality of LEDs 206 are energized during an operational time period (otherwise stated as the energization time of the LEDs during the operation time period) can be accomplished in any manner known in the art. As further described below, the device energizes, or turns on, LEDs in the first sub-set while de-energizing, or turning off, LEDs in the second sub-set to equalize aging of the two sub-sets or to reduce differences in aging between the two sub-sets. Threshold 214 can be used to divide LEDs 206 into the two sub-sets and can be selected and stored in memory element 216 for computer 212. For example, LEDs with an on-time below the threshold are assigned to the first sub-set. Device 200 is not limited to any particular threshold. In one embodiment, processor 210 dynamically calculates threshold 214.

In one embodiment, the processor energizes the first sub-set of LEDs and de-energizes the second sub-set of LEDs during correction time period 218. Time period 218 can be stored in the memory element or the processor can dynamically calculate time period 218. In one embodiment, the LEDs in the first sub-set are strobed at a particular frequency during time period 218. That is, the LEDs are turned on and off at the frequency. The frequency can be predetermined and stored in the memory element or can be dynamically calculated by the processor. In one embodiment, time period 218 is concurrent with an operational time period. Thus, time period 218 occurs when device 200 is being operated to generate an image output, that is, during "normal" operation of the device.

In one embodiment, energizing the first sub-set during correction time period 218 is unrelated to energizing the first sub-set for purposes of evaluating an image produced by the energizing of the first sub-set. For example, the first sub-set of LEDs is not energized as part of control operations such as: generating a test patch, on the photoreceptor, of marking material of predetermined desired properties such as optical density; measuring the actual properties of the test patch; and comparing the actual and desired properties. Stated otherwise, energizing and de-energizing the two sub-sets of LEDs described above is a separate and independent operation.

The tracking and analyzing of on-times, and sorting of LEDs 206 into the two sub-sets can be done on at least the following levels: by individual LED, by groups of LEDs, or by chip. Each of these levels has different processing and storage requirements and are further described below. At the level of individual LEDs, in one embodiment, the processor determines average 220 of the energization times for LEDs 206. The processor determines that average 222 of the number of times LEDs in the first plurality, or sub-set, of the plurality of LEDs 206 are energized during the first operational time period is less than average 220, for example, by specified amount 224. Amount 224 can be selected and stored in memory element 216, or processor 210 can dynamically calculate amount 224. In this example, energizing the first sub-set of LEDs would entail only energizing LEDs with energization times less than to average 222, while de-energizing the second sub-set of LEDs would entail only de-energizing LEDs with a respective energization time greater than average 222. LEDs with an on-time equal to average 222 could be assigned to either sub-set.

Figure 6:
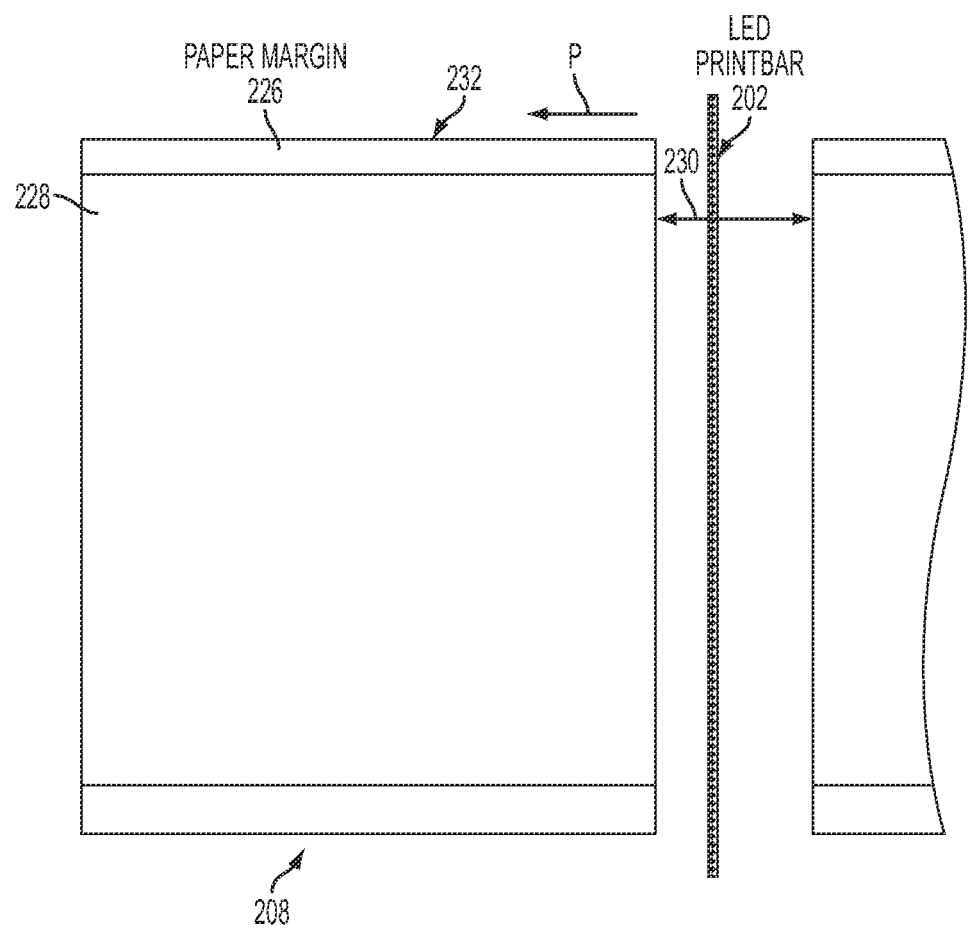

FIG. 6 illustrates printbar 202 and portions of photoreceptor 208 shown in FIG. 4. In FIG. 6, portions 226 of the photoreceptor are typically associated with areas outside of the paper margin for a typical printed document, while portion 228 is associated with areas inside the paper margin. As an example, usage of LEDs 206 aligned in process direction P with portions 226 is about 0-1 percent during typical operation time periods and usage of LEDs 206 aligned in direction P with portion 228 is about 5-20 percent during typical operation time periods. In one embodiment, the first sub-set of LEDs is aligned with portion 226 and the second sub-set of LEDs is aligned with portion 228. In one embodiment, the first sub-set of LEDs is energized when the LEDs are aligned with inter-document zone (IDZ) 230 on the photoreceptor. Thus, the energizing of the first sub-set of LEDs does not interfere with printing operations in document zone 232.

At the level of groups of LEDs, in one embodiment, the processor is for selecting a plurality of groups of LEDs from the first plurality of LEDs and determining, for each group of LEDs in the plurality of groups of LEDs, how often LEDs in each group of LEDs are energized during the first operational time period. Then, the processor determines whether LEDs for a first group of LEDs or a first plurality of groups of LEDs have been energized less than LEDs for a second group of LEDs or a second plurality of groups of LEDs. Thus, rather than focusing on how often individual LEDs are energized, the processor focuses on energization of groups of LEDs.

Processing complexity and time and memory/storage requirements may be reduced with the preceding group approach. For example, rather than storing and comparing energization times for a large number of individual LEDs, a smaller number of energization times for groups of LEDs can be stored and compared. The sorting metric for a group of LEDs could include, but is not limited to, a simple average of on-times for LEDs in a group or any other statistical function known in the art. In this example, energizing the first sub-set of LEDs would entail energizing the first group of LEDs or the first plurality of groups of LEDs, while de-energizing the second sub-set of LEDs would entail de-energizing the second group of LEDs or the second plurality of groups of LEDs. In one embodiment, the processor selects the plurality of groups such that a number of LEDs in said each group is a minimal number of LEDs able to produce a specified visual frequency when the image recording device is operated to generate an image output.

In one embodiment, LEDs 206 are grouped into pluralities of half tone cells and the processor is for determining, for each half tone cell, how often LEDs in each half tone cell are energized during the first operational time period. By half tone cell we mean a unit or grouping of LEDs used to simulate gray-scale or continuous tone reproduction. That is, the groups of LEDs noted above are respective half tone cells. In one embodiment, the processor determines that LEDs for a first group of half tone cells have been energized less than LEDs for a second group of half tone cells. In this example, energizing the first sub-set of LEDs would entail energizing LEDs for the first group of half tone cells, while de-energizing the second sub-set of LEDs would entail de-energizing LEDs for the second group of half tone cells.

At the chip level, in one embodiment, the processor is for determining how often LEDs on each chip 204 are energized during the first operational time period and the selecting of the sub-sets of LEDs noted above is done on a chip by chip basis. For example, the processor determines that LEDs for a first chip 204 or first group of chips 204 have been energized less than LEDs for a second chip 204 or a second group of chips 204. The comparison metric for LEDs on a chip could include, but is not limited to, a simple average of on-times for LEDs on the chip, or any other statistical function known in the art. Processing complexity and time and memory/storage requirements may be reduced with the preceding chip approach. For example, rather than storing and comparing energization times for a large number of individual LEDs, a smaller number of energization times for chips can be stored and compared. In this example, energizing the first sub-set of LEDs would entail energizing all the respective LEDs on the first chip 204 or on chips 204 in the first group of chips, for example, chip(s) aligned with portion 226 in direction P, while de-energizing the second sub-set of LEDs would entail de-energizing all the respective LEDs on the second chip 204 or chips 204 in the second group of chips, for example, chip(s) aligned with portion 228 in direction P. Stated otherwise, all the LEDs on a chip are either energized or de-energized according to the process described above for the first and second sub-sets of LEDs.

The preceding chip approach accounts for variations between wafers from which chips are formed, variations within a wafer from which chips are formed, and variations between individual chips. For example, variance of physical parameters may be greatest between wafers; however, it can be assumed that chips 204 are from a same wafer. Thus, the largest variance associated with different wafers is likely not a consideration. Variance between chips from a same wafer may be sufficient to warrant consideration. However, variance within a single chip is likely to be minimal. Therefore, treating the LEDs on a single chip collectively accounts for both the variance between chips and the similarity within a chip.

In one embodiment, a portion of the IDZ is used for operation of the image recording device for purposes of evaluating an image created on one portion of the respective IDZ, for example, for generating a test patch as described above. The processor is for selecting another portion of the IDZ upon which the first sub-set of LEDs is to be energized, and operating the device such that the two portions of the IDZ do not overlap during correction time period 218. Thus, energizing the first sub-set of LEDs does not interfere with other operations of the device. In one embodiment, if the total area required for the two portions exceeds the available area in the IDZ, the processor calculates and implements optimized ratios between the two portions.

In one embodiment, time period 218 is non-concurrent with an operational time period in which the printer is operated to generate print output. That is, operations to balance aging of LEDs 206 do not occur during "normal" operation of the device. Further, the photoreceptor remains in a fixed position during time period 218. After the first sub-set of LEDs is operated, any images created on the photoreceptor during time period 218 are scheduled and cleaned away before device 200 is used for the next operational time period.

In one embodiment, correction time period 218 is non-concurrent with an operational time period in which the image recording device is operated to generate an image output and toner supply to the photoreceptor is restricted or eliminated during correction time period 218. Thus, creation of images on the photoreceptor during energization of the first sub-set of LEDs 206 is eliminated or minimized. The foregoing operation reduces costs for operating device 200 by eliminating or reducing toner usage and simplifies operation of device 200 by eliminating or reducing the requirement to schedule and clean away images created by operation of the first sub-set of LEDs.

The present disclosure mitigates the noticeable LED, or emitter, degradation effects noted above by equalizing usage of LED emitters by energizing, for example, pulsing, low usage emitters in selected inter-document zones, or by energizing, for example, pulsing, low usage emitters while the photoreceptor is in a fixed position. As noted above, device 200 and methods using device 200 track individual emitter usage, or usage of sub-blocks of the LED printbar. Examples of sub-blocks are the LED groups and half tone cells noted above, as well as individual chips.

Algorithms for how often and what amounts of correction are to be applied to various LEDs 206 can be relatively simple or very complex. In general, the algorithm functions to age LEDs 206 sufficiently to obtain uniform usage that smoothes out statistical anomalies and short term trends. An example of a relatively simple algorithm ages low usage emitters without unnecessarily aging emitters in the image area, for example, only energizing LEDs aligned with portions 226 in FIG. 6.

A more complicated algorithm could track relative aging of LEDs associated with higher use zones, for example, LEDs aligned with portion 228 in FIG. 6, and age these LEDs accordingly. The differentiator between the first and second sub-groups, for example, threshold 214, can be sized, for example, kept large enough, to prevent prematurely aging LEDs that could eventually see some coverage with different prints/jobs.

Figure 1:
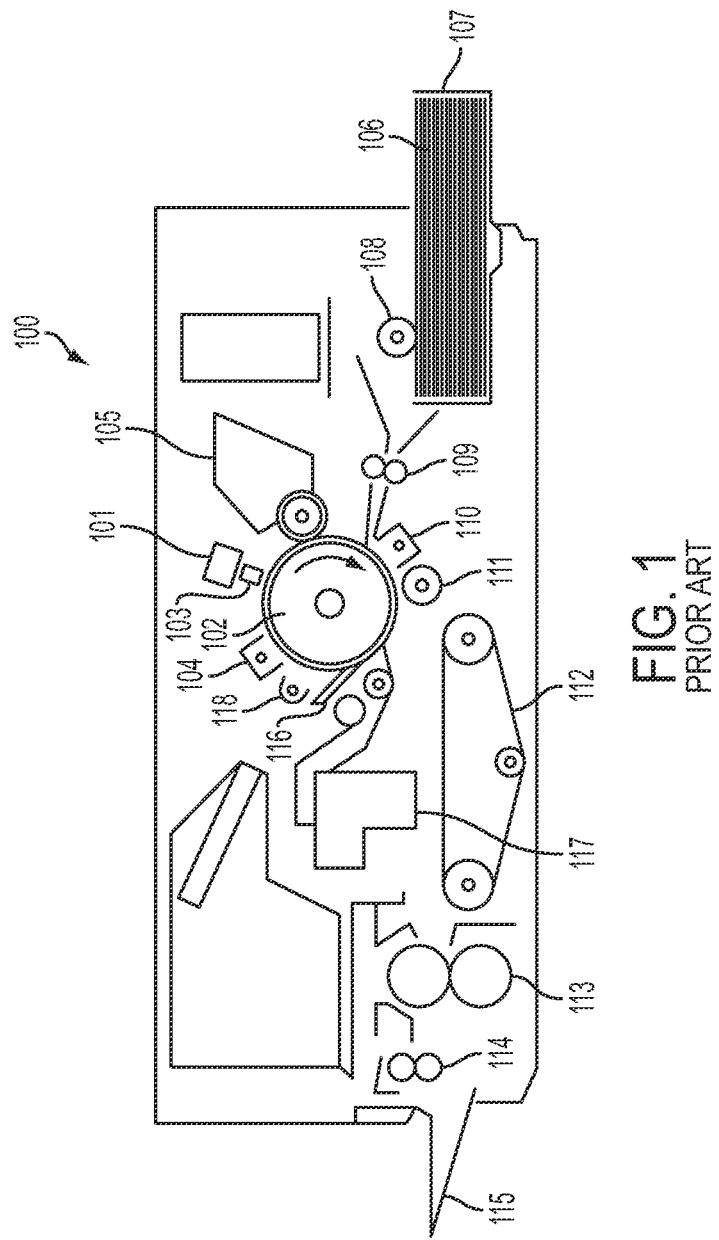
FIG. 1 schematically shows a prior art image recording apparatus with a light-emitting diode (LED) printbar.
Figure 2:
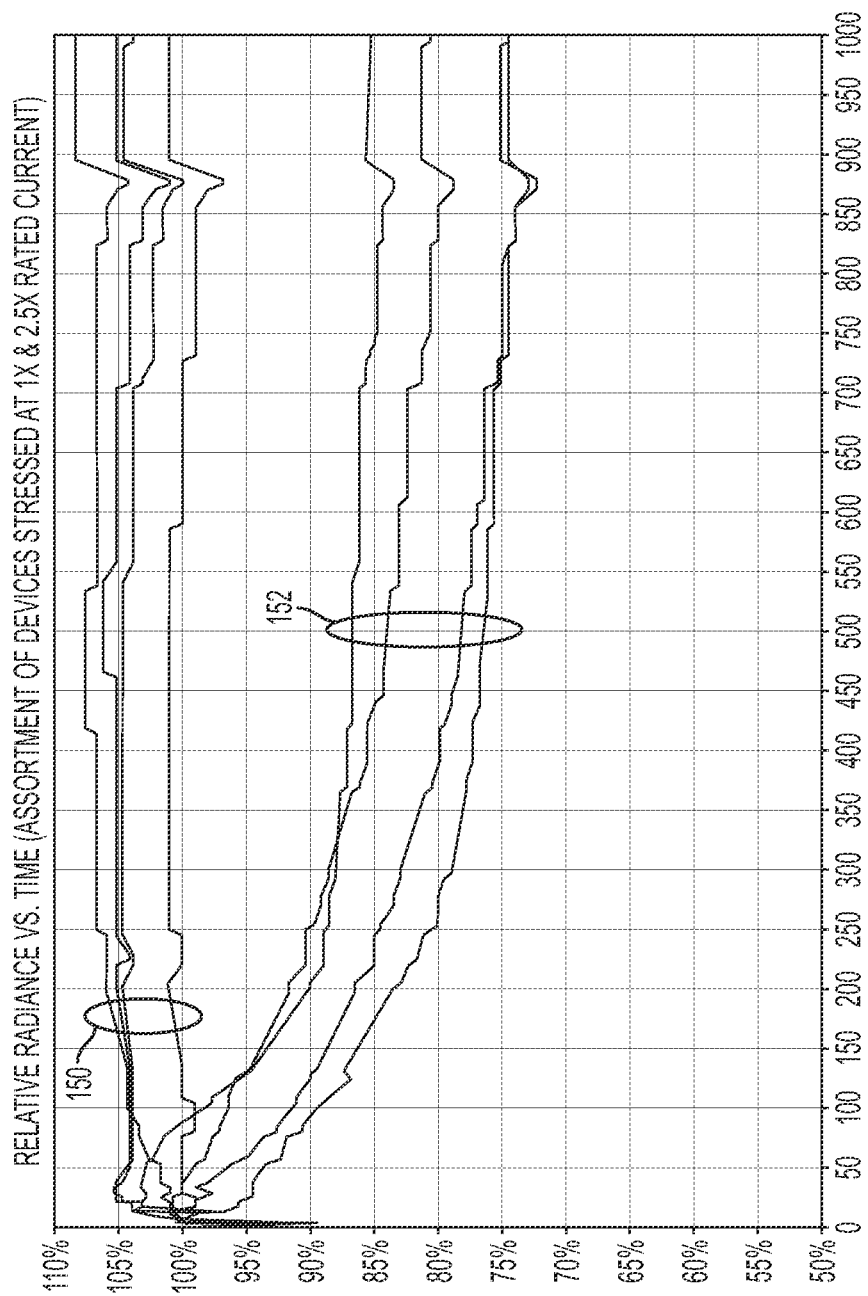
FIG. 2 shows typical curves for LED degradation with time.
Figure 3:
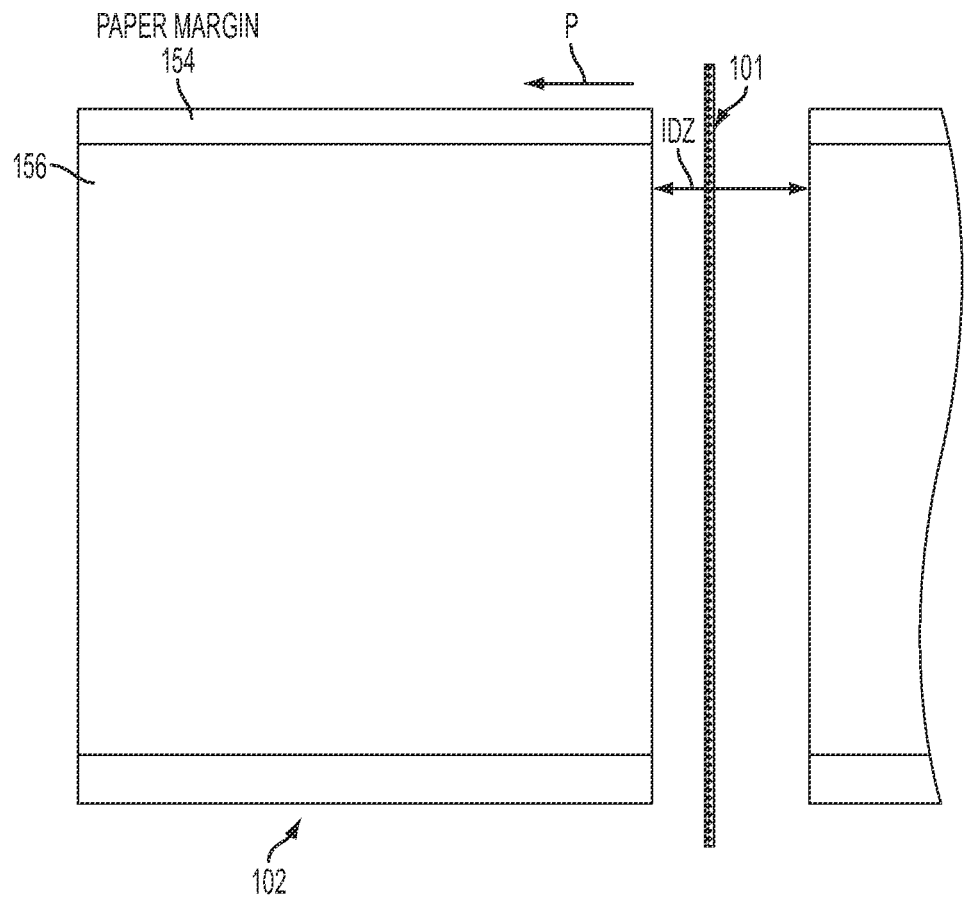
FIG. 3 shows typical LED usage for an LED printbar with respect to portions of the photoreceptor

In one embodiment, the processor tracks average 220 and when the average drops below a specified amount, the on-time, or strobe time, for all of LEDs 206 is increased to compensate for aging of the LEDs. The dropping of the average below the specified amount generally indicates that the majority of the LEDs are operating in a manner represented by the relatively flat portion of curves 152 in FIG. 2, while low usage LEDs may still be operating in a manner represented by the steeper negative slope of curves 152 or by the positive slope of curves 152. By increasing the strobe time, the operation of the low usage LEDs is moved toward the flat portion of curves 152 while the operation of the majority of the LEDs moves toward or further along the flat portion. That is, the output of the low usage LEDs is lowered by a relatively large amount while the output of the majority of the LEDs is lowered by a relatively smaller amount, which acts to equalize the respective outputs of the low usage LEDs and the majority of the LEDs.

Device 200 and methods using device 200 have at least the following advantages:
1. Removal of visible artifacts due to aging difference in areas like margins and heavily written portions of a document.
2. Extending the life of an LED printbar beyond the specified −10%, even if the above defects are acceptable at −10%, for example, due to the lack of visible artifacts that would be present without uniform aging. This could increase the life of a printbar by 5 to 10 times for high volume applications, for example, life for degradation of 10% vs. 30%.
3. At a given LED printbar replacement life, the print speed could be increased by using this method since operating higher on the spot profile (lower erg/cm$^2$, faster process rate assuming data rate can be handled) increases the sensitivity to half-tone variations with spot power variations.
4. The operations described above can be done without costly online or offline scanner/sensor calibration.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A computer-based method for extending light emitting diode (LED) printbar life or improving image quality for an image recording device including a photoreceptor and an LED printbar with a first plurality of LEDs, comprising:
   displacing the photoreceptor in a process direction;
   determining, using a processor for at least one specially programmed computer, how often LEDs in the first plurality of LEDs are energized during a first operational time period in which the image recording device is operated to generate an image output;
   determining, using the processor, that a second plurality of LEDs in the first plurality of LEDs has been energized less than a third plurality of LEDs in the first plurality of LEDs; and
   using the processor, during a correction time period, to energize the second plurality of LEDs and de-energize the third plurality of LEDs while the second plurality of LEDs are aligned with an inter-document zone (IDZ) on the photoreceptor such that a plane, in a direction substantially orthogonal to the process direction, passes through the second plurality of LEDs,
   wherein:
   the correction time period is concurrent with the first operational time period.

2. The method of claim 1, wherein the energizing of the second plurality of LEDs during the correction time period is unrelated to energizing the second plurality of LEDs for purposes of evaluating an image produced by the energizing of the second plurality of LEDs.

3. The method of claim 1, wherein the printbar includes a plurality of chips, the method further comprising determining, using the processor, how often LEDs on each chip in the plurality of chips are energized during the first operational time period, wherein:
   energizing the second plurality of LEDs includes only energizing LEDs on a first chip from the plurality of chips; and,
   de-energizing the third plurality of LEDs includes only de-energizing LEDs on a second chip from the plurality of chips.

4. The method of claim 1, further comprising:
   selecting, using the processor, a plurality of groups of LEDs from the first plurality of LEDs; and,
   determining, for each group of LEDs in the plurality of groups of LEDs and using the processor, how often LEDs in said each group of LEDs are energized during the first operational time period, wherein:
   energizing the second plurality of LEDs includes energizing LEDs for a first group from the plurality of groups; and,
   de-energizing the third plurality of LEDs includes de-energizing LEDs for a second group from the plurality of groups.

5. The method of claim 4 further comprising selecting the plurality of groups such that a number of LEDs in said each group is a minimal number of LEDs able to produce a specified visual frequency when the image recording device is operated to generate an image output.

6. The method of claim 1, wherein the LEDs in the first plurality of LEDs are grouped into a plurality of half tone cells, the method further comprising determining, for each half tone cell in the plurality of half tone cells and using the processor, how often LEDs in said each half tone cell are energized during the first operational time period, wherein:
   energizing the second plurality of LEDs includes energizing LEDs for a first half tone cell in the plurality of half tone cells; and,
   de-energizing the third plurality of LEDs includes de-energizing LEDs for a second half tone cell in the plurality of half tone cells.

7. The method of claim 1, further comprising determining, using the processor, that an average of the number of times LEDs in a fourth plurality of LEDs in the first plurality of LEDs are energized during the first operational time period is less than the average of the number of times LEDs in the first plurality of LEDs are energized during the first operational time period, wherein:
  energizing the second plurality of LEDs includes energizing the fourth plurality of LEDs; and,
  de-energizing the third plurality of LEDs includes de-energizing LEDs for the first plurality of LEDs less the LEDs for the fourth plurality of LEDs.

8. The method of claim 1, wherein a first portion of a respective IDZ is used for operation of the image recording device for purposes of evaluating an image created on the first portion of the respective IDZ, the method further comprising:
  selecting, using the processor, a second portion of the IDZ required for energizing the second plurality of LEDs; and,
  using the processor to operate the image recording device such that the first and second portions of the IDZ do not overlap during the correction time period.

9. An image recording device with extended light emitting diode (LED) printbar life or improved image quality, comprising:
  a photoreceptor;
  an LED printbar with a first plurality of LEDs; and,
  a processor for at least one specially programmed computer, the processor for:
    determining how often LEDs in the first plurality of LEDs are energized during a first operational time period in which the image recording device is operated to generate an image output;
    determining that a second plurality of LEDs in the first plurality of LEDs has been energized less than a third plurality of LEDs in the first plurality of LEDs; and,
    during a correction time period, energizing the second plurality of LEDs and de-energizing the third plurality of LEDs while the second plurality of LEDs is aligned with an inter-document zone (IDZ) on the photoreceptor such that a plane in a direction substantially orthogonal to a process direction passes through the second plurality of LEDs and the IDZ,
    wherein:
      the photoreceptor moves with respect to the printbar in the process direction;
      the correction time period is concurrent with the first operational time period;
      the printbar includes a plurality of chips;
      the processor is for determining how often LEDs on each chip in the plurality of chips are energized during the first operational time period;
      energizing the second plurality of LEDs includes energizing all LEDs on a first chip from the plurality of chips; and,
      de-energizing the third plurality of LEDs includes de-energizing all LEDs on a second chip from the plurality of chips.

10. The device of claim 9, wherein the energizing of the second plurality of LEDs during the correction time period is unrelated to energizing the second plurality of LEDs for purposes of evaluating an image produced by the energizing of the second plurality of LEDs.

11. The image recording device of claim 9, wherein:
  the processor is for:
    selecting a plurality of groups of LEDs from the first plurality of LEDs; and,
    determining, for each group of LEDs in the plurality of groups of LEDs, how often LEDs in said each group of LEDs are energized during the first operational time period;
  energizing the second plurality of LEDs includes energizing LEDs for a first group from the plurality of groups; and,
  de-energizing the third plurality of LEDs includes de-energizing LEDs for a second group from the plurality of groups.

12. The image recording device of claim 11 wherein the processor is for selecting the plurality of groups such that a number of LEDs in said each group is a minimal number of LEDs able to produce a specified visual frequency when the image recording device is operated to generate an image output.

13. The image recording device of claim 9, wherein:
  the LEDs in the first plurality of LEDs are grouped into a plurality of half tone cells;
  the processor is for determining, for each half tone cell in the plurality of half tone cells, how often LEDs in said each half tone cell are energized during the first operational time period;
  energizing the second plurality of LEDs includes energizing LEDs for a first half tone cell in the plurality of half tone cells; and,
  de-energizing the third plurality of LEDs includes de-energizing LEDs for a second half tone cell in the plurality of half tone cells.

14. The image recording device of claim 9, wherein:
  the processor is for determining that an average of the number of times LEDs in a fourth plurality of LEDs in the first plurality of LEDs are energized during the first operational time period is less than the average of the number of times LEDs in the first plurality of LEDs are energized during the first operational time period;
  energizing the second plurality of LEDs includes energizing the fourth plurality of LEDs; and,
  de-energizing the third plurality of LEDs includes de-energizing LEDs for the first plurality of LEDs less the LEDs for the fourth plurality of LEDs.

15. The image recording device of claim 9, wherein:
  a first portion of a respective IDZ is used for operation of the image recording device for purposes of evaluating an image created on the first portion of the respective IDZ; and,
  the processor is for:
    selecting a second portion of the IDZ required for energizing the second plurality of LEDs; and,
  operating the image recording device such that the first and second portions of the IDZ do not overlap during the correction time period.

16. A computer-based method for extending light emitting diode (LED) printbar life or improving image quality for an image recording device including a photoreceptor and an LED printbar with a first plurality of LEDs, comprising:
  determining, using the processor, how often LEDs on each chip in a plurality of chips on the printbar are energized during an operational time period during which the device is operated to generate an image output;
  determining, using the processor, that LEDs for a first chip in the plurality of chips have been energized less than LEDs for a second chip in the plurality of chips; and,
  during a correction time period concurrent with the operational time period:
    energizing, using the processor, all the LEDs for the first chip while the first chip is aligned with an inter-document zone (IDZ) on the photoreceptor in a direction orthogonal to a process direction such that a plane orthogonal to the process direction sasses through the first chip and the IDZ; and, de-energizing, using the processor, all the LEDs for the second chip, wherein:

the photoreceptor moves with respect to the printbar in the process direction.

17. An image recording device with extended light emitting diode (LED) printbar life or improved image quality, comprising:

a photoreceptor;

an LED printbar with at least ten chips, each chip including a respective plurality of LEDs; and, a processor for at least one specially programmed computer, the processor for:

determining, using the processor, how often LEDs on each chip in a plurality of chips on the printbar are energized during an operational time period during which the device is operated to generate an image output;

determining, using the processor, that LEDs for a first chip in the plurality of chips have been energized less than LEDs for a second chip in the plurality of chips; and, during a correction time period concurrent with the operational time period:

energizing, using the processor, all the LEDs for the first chip while the first chip is aligned with an inter-document zone (IDZ) on the photoreceptor in a direction orthogonal to the process direction such that a plane orthogonal to the process direction passes through the first chip and the IDZ; and, de-energizing, using the processor, all the LEDs for the second chip, wherein:

the photoreceptor moves with respect to the printbar in the process direction.

18. An image recording device with extended light emitting diode (LED) printbar life or improved image quality, comprising:

a photoreceptor;

an LED printbar with at least ten chips, each chip including a respective plurality of LEDs; and, a processor for at least one specially programmed computer, the processor for:

determining an average of the energization times for the respective plurality of LEDs in each chip during an operational time period during which the device is operated to generate an image output;

comparing the average to a specified amount; and, energizing, during a correction time period, the respective plurality of LEDs in each chip when the average is less than the specified amount, wherein:

the photoreceptor moves with respect to the printbar in a process direction;

the correction time period is concurrent with the operational time period; and, when the respective plurality of LEDs in each chip are energized, the respective plurality of LEDs are aligned, in a direction orthogonal to the process direction, with an inter-document zone (IDZ) on the photoreceptor, such that a plane orthogonal to the process direction passes through the respective plurality of LEDs and the IDZ.

19. A computer-based method for extending light emitting diode (LED) printbar life or improving image quality for an image recording device including a photoreceptor and an LED printbar with a plurality of LEDs, comprising:

selecting, using a processor for at least one specially programmed computer, a plurality of groups of LEDs from the plurality of LEDs such that a number of LEDs in said each group is a minimal number of LEDs able to produce a specified visual frequency when the image recording device is operated to generate an image output;

determining, for each group of LEDs in the plurality of groups of LEDs and using the processor, how often LEDs in said each group of LEDs are energized during an operational time period during which the device is operated to generate an image output;

determining, using the processor, that a first group from the plurality of groups has been energized less than a second group from the plurality of groups; and, using the processor, during a correction time period, to energize the LEDs in the first group and de-energize the LEDs in the second group, wherein:

the photoreceptor moves in a process direction with respect to the printbar;

the correction time period is concurrent with the operational time period; and, when the LEDs in the first group are energized, the LEDs in the first group are aligned, in a direction orthogonal to the process direction, with an inter-document zone (IDZ) on the photoreceptor such that a plane orthogonal to the process direction passes through the first group and the IDZ when the LEDs in the first group are energized.

* * * * *